United States Patent
Smith et al.

(10) Patent No.: US 10,856,605 B2
(45) Date of Patent: Dec. 8, 2020

(54) POLYVINYL CHLORIDE SAFETY BOOTS

(71) Applicant: Tingley Rubber Corporation, Piscataway, NJ (US)

(72) Inventors: Steven A. Smith, Pompton Plains, NJ (US); James P. Towey, Nutley, NJ (US); Robert N. Petersen, Somerset, NJ (US); Wang Sheng Ming, Zhejiang (CN)

(73) Assignee: Tingley Rubber Corporation, Piscataway, NJ (US)

(*) Notice: Subject to any disclaimer, the term of this patent is extended or adjusted under 35 U.S.C. 154(b) by 137 days.

(21) Appl. No.: 15/879,961

(22) Filed: Jan. 25, 2018

(65) Prior Publication Data

US 2018/0206589 A1    Jul. 26, 2018

Related U.S. Application Data

(60) Provisional application No. 62/451,025, filed on Jan. 26, 2017.

(51) Int. Cl.
| | |
|---|---|
| *A43B 13/04* | (2006.01) |
| *A43B 17/16* | (2006.01) |
| *A43B 23/08* | (2006.01) |
| *A43B 23/02* | (2006.01) |
| *C08L 21/00* | (2006.01) |
| *C08L 27/06* | (2006.01) |
| *C08L 75/04* | (2006.01) |
| *A43B 7/32* | (2006.01) |

(Continued)

(52) U.S. Cl.
CPC .............. *A43B 13/04* (2013.01); *A43B 7/32* (2013.01); *A43B 17/16* (2013.01); *A43B 23/0215* (2013.01); *A43B 23/06* (2013.01); *A43B 23/086* (2013.01); *A43B 23/087* (2013.01); *C08K 7/14* (2013.01); *C08L 21/00* (2013.01); *C08L 27/06* (2013.01); *C08L 75/04* (2013.01); *C08G 2410/00* (2013.01)

(58) Field of Classification Search
CPC ............ A43B 13/04; A43B 7/32; A43B 17/16
See application file for complete search history.

(56) References Cited

U.S. PATENT DOCUMENTS

| | | | | |
|---|---|---|---|---|
| 3,400,429 A | * | 9/1968 | Herbert | B29D 35/084 |
| | | | | 425/4 R |
| 4,257,177 A | * | 3/1981 | Unsted | A43B 7/32 |
| | | | | 12/146 D |

(Continued)

FOREIGN PATENT DOCUMENTS

| | | |
|---|---|---|
| CN | 201451657 U | 5/2010 |
| DE | 2061036 A1 | 6/1972 |
| KR | 101313897 B1 | 9/2013 |

OTHER PUBLICATIONS

Machine Translation of CN 201451657 first published in Chinese, May 12, 2010, 11 pages.

(Continued)

*Primary Examiner* — Jila M Mohandesi
(74) *Attorney, Agent, or Firm* — Servilla Whitney LLC

(57) ABSTRACT

A boot comprises: an outsole and an upper affixed to the outsole, the upper comprising a polyvinyl chloride (PVC) upper body and a composite toe cap. The composite toe cap comprises a fiberglass reinforced polymer, and the composite toe cap comprises a tapered surface.

18 Claims, 3 Drawing Sheets

(51) Int. Cl.
   *C08K 7/14*    (2006.01)
   *A43B 23/06*   (2006.01)

(56) References Cited

U.S. PATENT DOCUMENTS

| | | | | |
|---|---|---|---|---|
| 5,189,814 A | * | 3/1993 | Barma | A43B 1/10 |
| | | | | 12/142 E |
| 5,659,979 A | * | 8/1997 | Sileo | A43B 1/0072 |
| | | | | 206/223 |
| 2003/0097768 A1 | * | 5/2003 | Baek | A43B 5/0405 |
| | | | | 36/55 |
| 2005/0144809 A1 | * | 7/2005 | Yang | A43B 23/087 |
| | | | | 36/77 R |
| 2006/0213086 A1 | * | 9/2006 | Ching | A43B 23/082 |
| | | | | 36/77 R |
| 2009/0145006 A1 | * | 6/2009 | Hubner | A43B 13/10 |
| | | | | 36/77 R |
| 2011/0185602 A1 | * | 8/2011 | Kurth | A43B 1/0009 |
| | | | | 36/77 R |
| 2013/0047471 A1 | * | 2/2013 | Liang | A43D 86/00 |
| | | | | 36/136 |
| 2014/0215851 A1 | * | 8/2014 | Solsona | A43B 9/02 |
| | | | | 36/84 |
| 2014/0223773 A1 | * | 8/2014 | Burman | A43B 23/081 |
| | | | | 36/87 |
| 2016/0157552 A1 | | 6/2016 | Lee | |

OTHER PUBLICATIONS

Machine Translation of DE 2061036 first published in German, Jun. 15, 1972, 4 pages.
Machine Translation of KR 101313897 first published in Korean, Sep. 30, 2013, 8 pages.

* cited by examiner

POLYVINYL CHLORIDE SAFETY BOOTS

CROSS-REFERENCE TO RELATED APPLICATIONS

This application claims priority under 35 U.S.C. § 119(e) to U.S. Provisional Application No. 62/451,025, filed Jan. 26, 2017, the disclosure of which is incorporated herein by reference in its entirety.

TECHNICAL FIELD

The present disclosure generally relates to polyvinyl chloride (PVC) safety comprising a PVC upper that includes a composite toe cap and an outsole.

BACKGROUND

Protective (Safety) Toe Cap Footwear is subject to ASTM F2413-11. Steel toe safety boots are state of the art in meeting ASTM F2413-11. Steel toe safety boots have drawbacks with respect to added weight to a boot, and being conductive of heat and/or cold, rather than being insulating. In addition, sometimes metal detectors are activated by steel toe safety boots. Steel toe caps generally do not add appreciably volume or bulk to a toe box of a boot.

State of the art composite toe safety boots are generally bigger in the toe box due to composite toe caps needing to be bigger than steel toe caps to provide comparable protection in accordance with ASTM F2413-11. The bigger toe box can add to bulkiness of the boot and reduce comfort.

There is an on-going need to provide safety toe cap boots that are comfortable while meeting safety requirements.

SUMMARY

Provided are polyvinyl chloride (PVC) boots with composite toe caps, the boot providing a comfortable fit while meeting safety requirements.

An aspect is a boot comprising: an outsole and an upper affixed to the outsole, the upper comprising a polyvinyl chloride (PVC) upper body and a composite toe cap. The composite toe cap comprises a reinforced polymer matrix composite and a tapered surface.

Another aspect is a liquid protection knee boot comprising: an outsole of a first polymeric material; and an upper affixed to the outsole, the upper comprising a polyvinyl chloride (PVC) upper body and a composite toe cap, a top surface region, a base region comprising a substantially uniform base thickness, and an anchor region comprising a thickness that is smaller than the base thickness. The top surface region comprises a tapered surface. The composite toe cap comprises a reinforced polymer matrix composite In a further aspect, a method of making a boot comprises: forming an outsole by injecting a first polymeric material into a first mold cavity; obtaining or forming a composite toe cap comprising a reinforced polymer matrix composite; forming an upper by injecting a PVC-based material into a second mold cavity around the toe cap; and affixing the upper to the outsole.

DETAILED DESCRIPTION

The polyvinyl chloride (PVC) boots disclosed herein have advantages in that they provide excellent liquid and/or water-proof protection while being certified as protective (safety) toe cap footwear using a composite toe cap. The boots have a composite toe cap that is dimensioned to provide a low-profile while meeting and/or exceeding compact testing requirements. Composite toe caps comprise a reinforced polymer matrix composite, for example, a fiberglass reinforced polymer that is compatible with PVC, and have a tapered surface to facilitate a low profile compared to other composite toe cap footwear. The safety toe cap PVC boots disclosed herein have profiles that are substantially the same as comparable PVC boots without a toe cap.

Current composite toe boots while being bulky in the toe box relative to steel toe boots also subject the bottom of a wear's foot to a transition from the toe cap area to the remaining area of where the foot contacts the boot upper bottom (or removable innersole if one is present). The PVC boots according to this disclosure have a toe cap whose a short anchor area eliminates exposure to such a transition.

Upon impact of a crushing force, the composite toe caps absorb the force and eventually relax back to their original shape. In contrast, steel toe caps upon impact of a crushing force remain permanently deformed. Also in contrast to steel toe caps, composite toe caps are insulating rather than conductive. PVC boots including composite toe caps are suitable for a wide range of working conditions, including those involving exposure to wet conditions and extreme temperatures.

Reference herein to "knee boot" refers to footwear designed to protect feet and lower legs, with a top of the boot extending nominally towards a wearer's knee. That is, a boot that is a knee boot covers all or a portion of a wearer's calf and may extend to the wearer's knee or just below it.

Before describing several exemplary embodiments of the invention, it is to be understood that the invention is not limited to the details of construction or process steps set forth in the following description. The invention is capable of other embodiments and of being practiced or being carried out in various ways.

Figure 1:
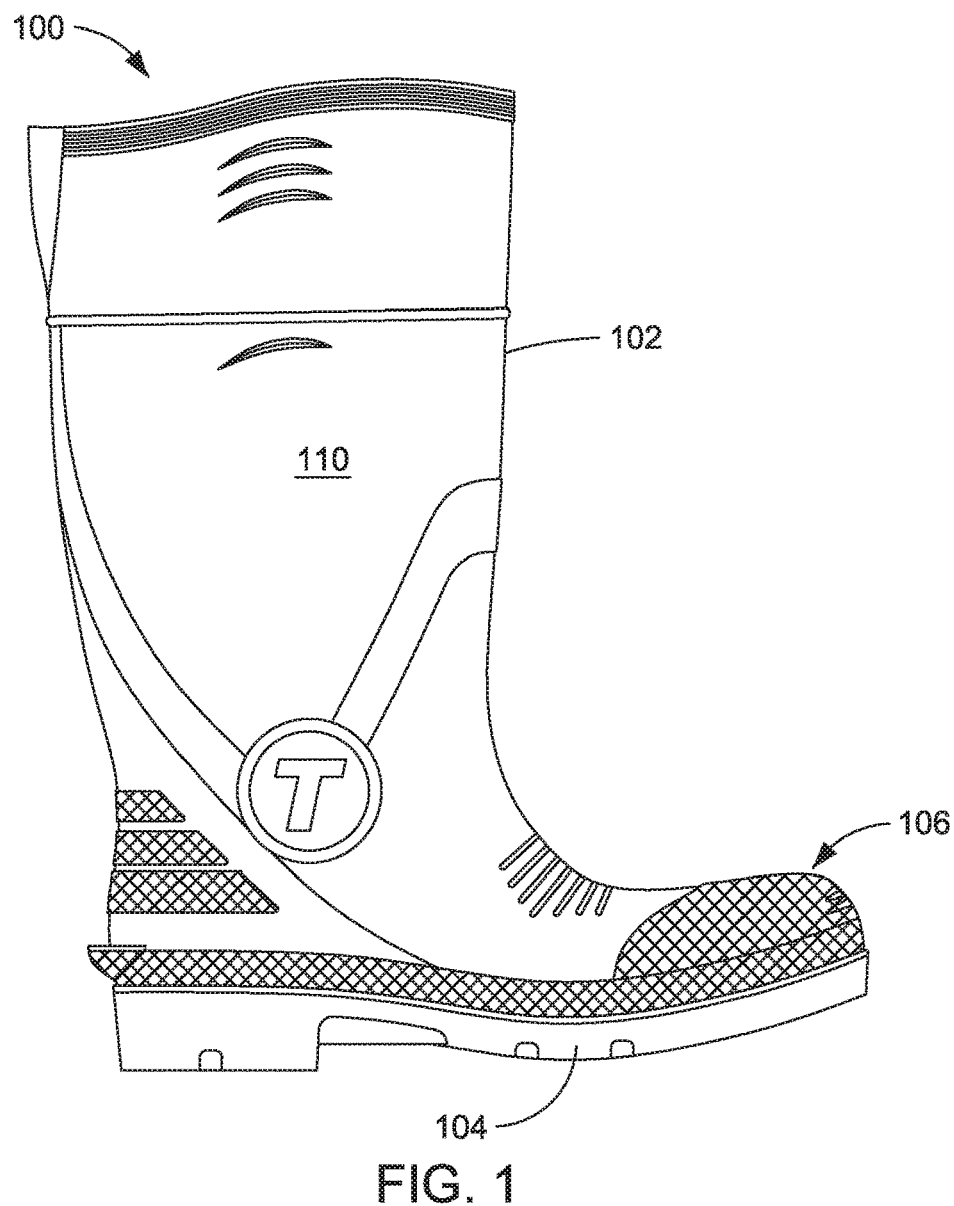
FIG. 1 is a schematic side view of a boot.

Turning to the figures, FIG. 1 is a schematic side view of a boot 100 comprising an upper 102 and an outsole 104. The upper comprises a polyvinyl chloride (PVC) upper body 110. A toe box 106 is generally at the front of the boot. An external surface of the toe box 106 is textured for abrasion and wear purposes.

Figure 2:
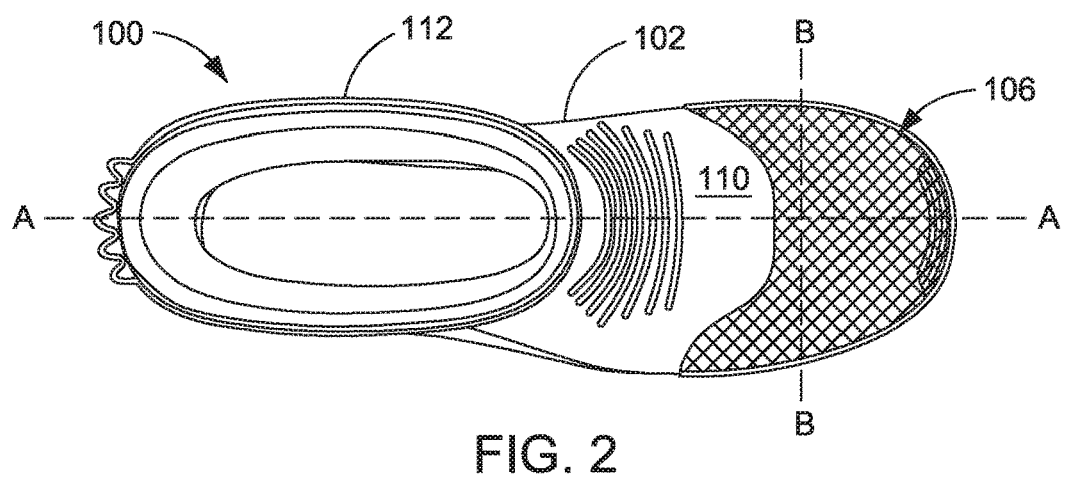
FIG. 2 is a schematic top view of the boot of FIG. 1.

FIG. 2 is a schematic top view of the boot of FIG. 1, where the upper 102 has upper body 110, comprising the toe area 106 and a topline edge 112. Line A-A is the nominal midline of the boot 100. Line B-B is perpendicular to line A-A as an indicator for a nominal location of the toe box 106.

Figure 3:
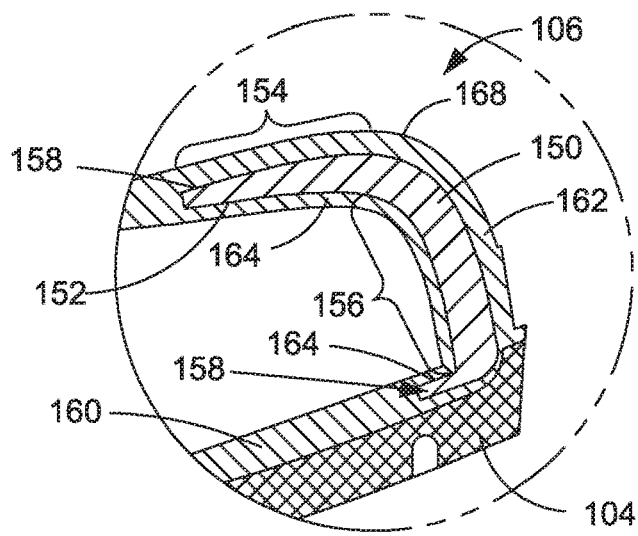
FIG. 3 is a schematic cross-section of a portion of a toe box in accordance with FIG. 2 nominally taken along line A-A.
Figure 4:
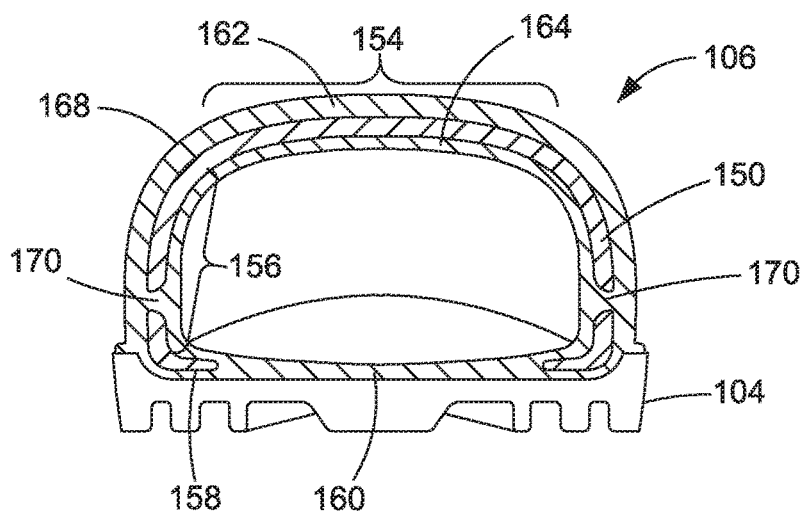
FIG. 4 is a schematic cross-section of a portion of a toe box in accordance with FIG. 2 nominally taken along line B-B.

With reference to FIGS. 3-4, FIG. 3 is a schematic cross-section of a portion of a toe box 106 in accordance with FIG. 2 nominally taken along line A-A and FIG. 4 is a schematic cross-section of a portion of a toe box in accordance with FIG. 2 nominally taken along line B-B. Composite toe cap 150 is located in the toe box 106, comprising a top surface region 154, a base region 156, and an anchor region 158. Toe box 106 has a bottom wall 160 in contact with the outsole 104 and a domed toe area 168 comprising a first wall 162 and a second wall 164.

The top surface region 154 and the base region 156 of the composite toe cap 150 are located between the first wall 162 and the second wall 164 of the domed area 168. The top surface region 154 of the toe cap, which is below a portion of the textured surface of the toe box 106, comprises a tapered surface 152. The tapered surface 152 allows for a streamlined profile of the toe box 106. The tapered surface 152 results from a gradual varying thickness in the top surface region 154. The tapered surface 152 slopes downwards towards the base region 156 at a steeper angle that a generally flat surface 153 of the top region 154, which is opposite the tapered surface 152. The base region 156 comprises a substantially uniform base thickness and is designed to absorb and distribute crush forces during wear. The anchor region 158 comprises an optional additional tapered surface 164. The anchor region 158 comprises a thickness that is smaller than the base thickness. The anchor region 158 holds the domed area 168 of the toe box 106 rigid. The walls 162 and 164 hold the toe cap 150 in place. The anchor region 180 extends a shorter distance from a front point of the boot relative to the top surface region 154.

In FIG. 4, first and second walls 162 and 164 meet and bond in a passage 170 defined by a channel (171 of FIGS. 6-7) of the composite toe cap 150. This facilitates manufacturing and keeping the toe cap 150 in place during wear.

Figure 5:
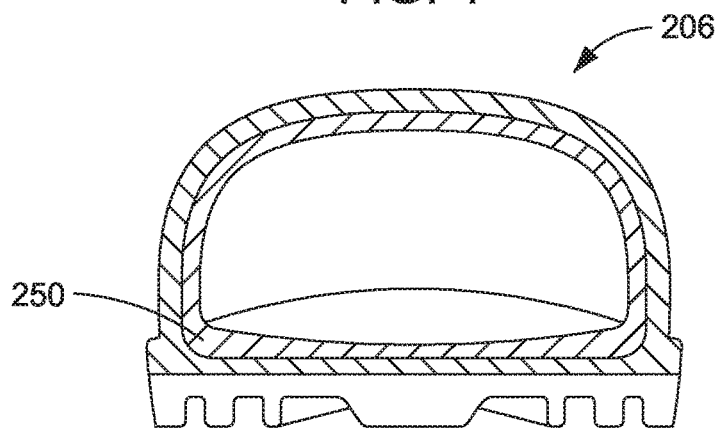
FIG. 5 is a schematic cross-section of a portion of a prior art toe box of a composite toe safety boot.

FIG. 5 is a schematic cross-section of a portion of a prior art toe box of a composite toe safety boot. Comparative toe box 206 comprises a comparative composite toe cap 250 that is located in the toe box 206. The comparative composite toe cap 250 adds bulk to the comparative toe box 206. Also, the wall of the comparative toe box 206 does not retain the comparative composite toe cap 250 in place. The comparative composite toe cap 250 subjects the bottom of a wear's foot to a transition from the toe cap area to the remaining area of the foot surface.

Figure 6:
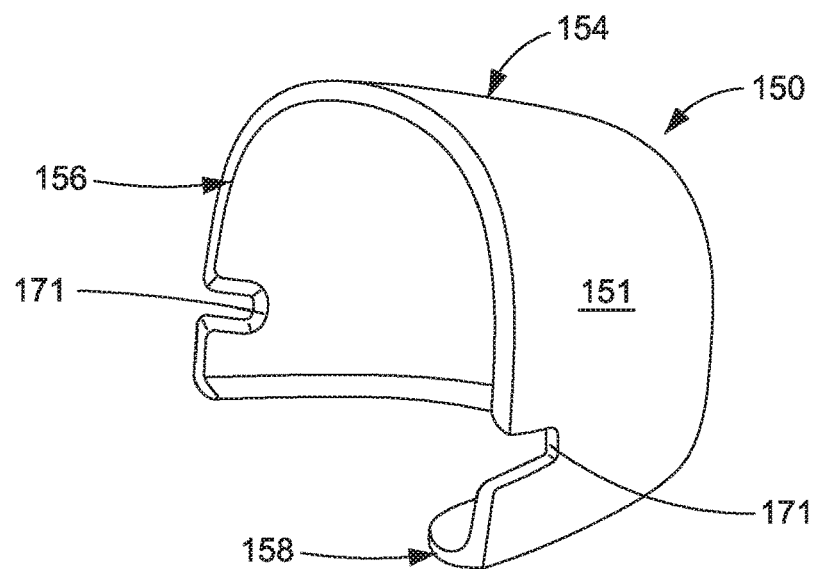
FIGS. 6-7 are schematic perspective views of composite toe caps.
Figure 7:
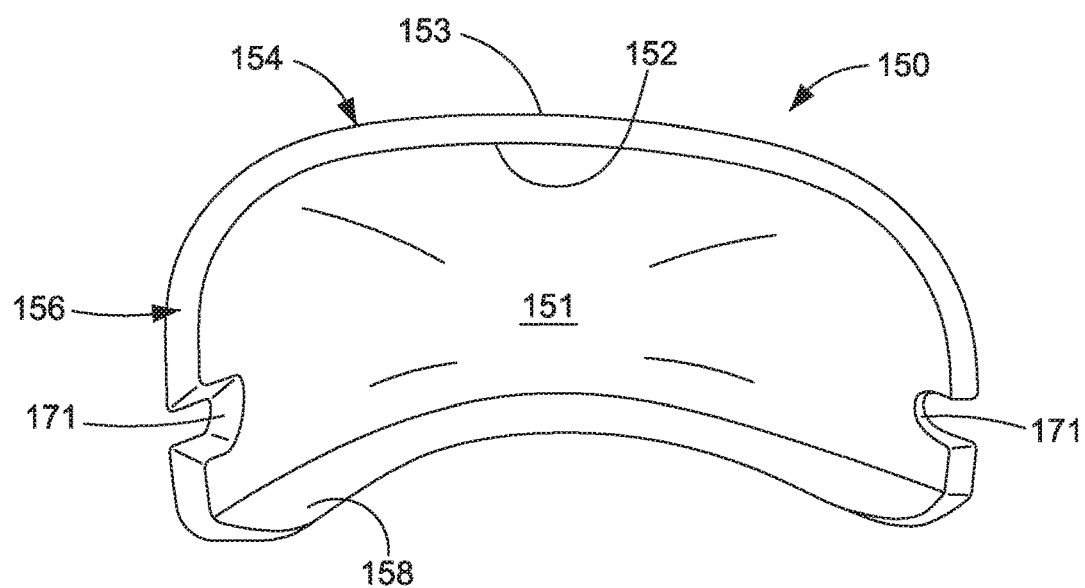

FIGS. 6-7 are schematic perspective views of a composite toe cap 150 according to an embodiment. The composite toe cap 150 has a body 151 with features including the top surface region 154, the base region 156, the anchor region 158, and channels 171. As mentioned with respect to FIG. 4, the first and second walls of the toe box meet and bond passages defined by channels 171 of the composite toe cap 150. This facilitates manufacturing and keeping the toe cap 150 in place during wear.

The tapered surface 152 results from a gradual varying thickness in the top surface region 154. The tapered surface 152 slopes downwards towards the base region 156 at a steeper angle that a generally flat surface 153 of the top region 154, which is opposite the tapered surface 152.

The toe cap comprises a reinforced polymer matrix composite. The polymer matrix is generally compatible with PVC in that a pre-fabricated toe cap can maintain its properties upon exposure to PVC under temperatures and pressures needed for injection molding with PVC. Polymer matrixes include but are not limited to PVC and vinyl ester. With respect to reinforcing materials/fibers for the polymer matrix, any material suitable to provide crush strength/protection may be used. Fiberglass is one such material. Graphite and aramid particles and fibers are also suitable reinforcing materials. In one or more embodiments, the toe cap comprises a fiberglass reinforced polymer. In one or more detailed embodiments, the reinforced polymer matrix composite comprises a fiberglass and polyvinyl chloride (PVC) composite, or a fiberglass and vinyl ester composite.

The upper in accordance with this disclosure is polyvinyl chloride, providing liquid and/or water-proof protection. The upper may contain additional features as desired, such heel kicks, bands, grips, inner texture, and the like to facilitate donning and removing the boot.

The outsole generally comprises a polymeric material that may be the same or that may be different from the polymeric material of the upper depending upon the desired functionality of the footwear, but which is compatible to facilitate attachment of the outsole to the upper. In one or more embodiments, an outsole is formed by injecting a first polymeric material into a first mold cavity. An upper is formed by combining an upper body and a composite toe cap. The composite toe cap is pre-fabricated, generally by molding a fiberglass-based composite material. The upper body is formed by injecting a PVC-based material into a second mold cavity around the toe cap. The outsole and upper may be made in any order. The upper is affixed to the outsole. In a specific embodiment, to affix the upper to the outsole, the upper is injection molded in direct contact with a pre-fabricated injection molded outsole.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein provided a description with reference to particular embodiments, it is to be understood that these embodiments are merely illustrative of the principles and applications of the disclosure. It will be apparent to those skilled in the art that various modifications and variations can be made to the present disclosure without departing from the spirit and scope thereof. Thus, it is intended that the present disclosure include modifications and variations that are within the scope of the appended claims and their equivalents.

What is claimed is:

1. A boot comprising:
    an outsole; and
    an upper affixed to the outsole, the upper comprising a polyvinyl chloride (PVC) upper body and a composite toe cap, the composite toe cap comprising a reinforced polymer matrix composite and a tapered surface, wherein the PVC upper body is a unitary construction comprising: a toe box comprising a bottom wall in contact with the outsole and the domed toe area comprising a first wall and a second wall, wherein the top surface region and the base region of the composite toe cap are located between the first wall and the second wall;
    wherein the composite toe cap comprises a top surface region comprising the tapered surface and a first surface opposite the tapered surface; a base region comprising a substantially uniform base thickness; and an anchor region comprising a thickness that is smaller than the base thickness; and wherein the top surface region comprises a varying thickness such that the tapered surface slopes towards the base region at a steeper angle than the first surface.

2. The boot of claim 1, wherein the anchor region comprises an additional tapered surface.

3. The boot of claim 1, wherein the bottom wall is in contact with a terminal edge, a top face, and a bottom face of the anchor region.

4. The boot of claim 1, wherein the anchor region is shorter distance from a front point of the boot relative to the tapered surface region.

5. The boot of claim 1, wherein the reinforced polymer matrix composite of the toe cap comprises a fiberglass and polyvinyl chloride (PVC) composite, or a fiberglass and vinyl ester composite.

6. The boot claim 1 whose profile is substantially the same as a boot comprising a comparable PVC upper body without a composite toe cap.

7. The boot of claim 1, wherein the outsole comprises a thermoplastic polymer.

8. The boot of claim 7, wherein the outsole comprises a thermoplastic polymer selected from the group consisting of rubber, thermoplastic polyurethane, and polyvinyl chloride.

9. The boot of claim 1, wherein the outsole comprises one or more integrally-formed features selected from the group consisting of: a toe, a heel, a heel strike, and cleats.

10. The boot of claim 1 in the form of a knee boot.

11. A liquid protection knee boot comprising:
an outsole of a first polymeric material; and
an upper affixed to the outsole, the upper comprising a polyvinyl chloride (PVC) upper body and a composite toe cap, the composite toe cap comprising a top surface region, a base region comprising a substantially uniform base thickness, and an anchor region comprising a thickness that is smaller than the base thickness, wherein the top surface region comprises a tapered surface, a first surface opposite the tapered surface, and a varying thickness such that the tapered surface slopes towards the base region at a steeper angle than the first surface, and wherein the PVC upper body is a unitary construction comprising: a toe box comprising a bottom wall in contact with the outside and a domed toe area comprising a first wall and a second wall, wherein the tapered surface region and the base region of the composite toe cap are located between the first wall and a second wall;

wherein the composite toe cap comprises a reinforced polymer matrix composite.

12. The liquid protection knee boot of claim 11, wherein the bottom wall is in contact with a terminal edge, a top face, and a bottom face of the anchor region.

13. The liquid protection knee boot of claim 11, wherein the anchor region comprises an additional tapered surface.

14. The liquid protection knee boot of claim 11, wherein the reinforced polymer matrix composite of the toe cap comprises a fiberglass and polyvinyl chloride (PVC) composite, or a fiberglass and vinyl ester composite.

15. The liquid protection knee boot of claim 11, wherein the outsole comprises a thermoplastic polymer selected from the group consisting of rubber, thermoplastic polyurethane, and polyvinyl chloride.

16. A method of making a boot comprising:
forming an outsole by injecting a first polymeric material into a first mold cavity;
obtaining or forming a composite toe cap comprising a reinforced polymer matrix composite, the composite toe cap comprising a top surface region, a base region comprising a substantially uniform base thickness, and an anchor region comprising a thickness that is smaller than the base thickness, wherein the top surface region comprises a tapered surface, a first surface opposite the tapered surface, and a varying thickness such that the tapered surface slopes towards the base region at a steeper angle than the first surface;
injecting a polyvinyl chloride (PVC)-based material into a second mold cavity to form a PVC upper body around the toe cap, wherein the PVC upper body is a unitary construction comprising: a toe box comprising a bottom wall in contact with the outside and a domed toe area comprising a first wall and a second wall, wherein the tapered surface region and the base region of the composite toe cap are located between the first wall and the second wall; and affixing the upper to the outsole.

17. The method of claim 16, wherein the reinforced polymer matrix composite of the toe cap comprises a fiberglass and polyvinyl chloride (PVC) composite, or a fiberglass and vinyl ester composite.

18. The method of claim 16, wherein the outsole comprises a thermoplastic polymer selected from the group consisting of rubber, thermoplastic polyurethane, and polyvinyl chloride.

* * * * *